(12) United States Patent
Lorey

(10) Patent No.: US 9,937,831 B2
(45) Date of Patent: Apr. 10, 2018

(54) SUSPENSION DEVICE

(71) Applicant: GRAMMER AG, Amberg (DE)

(72) Inventor: Konstantin Lorey, Schmidgaden (DE)

(73) Assignee: GRAMMER AG, Amberg (DE)

(*) Notice: Subject to any disclaimer, the term of this patent is extended or adjusted under 35 U.S.C. 154(b) by 0 days.

(21) Appl. No.: 15/633,996

(22) Filed: Jun. 27, 2017

(65) Prior Publication Data

US 2018/0001804 A1 Jan. 4, 2018

(30) Foreign Application Priority Data

Jul. 1, 2016 (DE) .................. 10 2016 112 105

(51) Int. Cl.
*F16M 13/00* (2006.01)
*B60N 2/50* (2006.01)
*B60N 2/16* (2006.01)
*B60N 2/54* (2006.01)

(52) U.S. Cl.
CPC ............. *B60N 2/502* (2013.01); *B60N 2/165* (2013.01); *B60N 2/1655* (2013.01); *B60N 2/505* (2013.01); *B60N 2/507* (2013.01); *B60N 2/544* (2013.01)

(58) Field of Classification Search
CPC ...... F16M 11/18; B60N 2/1615; B60N 2/165; B60N 2/1675; B60N 2/4242
USPC ....... 248/647, 648, 655, 669, 157, 421, 422, 248/188.1, 188.6; 297/344.12, 344.14, 297/344.15, 344.17; 296/65.02, 65.05
See application file for complete search history.

(56) References Cited

U.S. PATENT DOCUMENTS

| 4,573,657 A | * | 3/1986 | Sakamoto | B60N 2/502 248/421 |
| 4,786,024 A | * | 11/1988 | Goetz | A47C 3/38 248/157 |
| 4,948,081 A | * | 8/1990 | Hatta | B60N 2/1615 248/394 |
| 5,094,419 A | * | 3/1992 | Nini | B60N 2/0232 248/157 |

(Continued)

FOREIGN PATENT DOCUMENTS

DE 1896880 7/1964
DE 27 53 105 A1 6/1979

(Continued)

OTHER PUBLICATIONS

Search Report prepared by the German Patent Office dated Jun. 8, 2017, for German Patent Application No. 10 2016 112 105.3.

*Primary Examiner* — Terrell L McKinnon
*Assistant Examiner* — Michael McDuffie
(74) *Attorney, Agent, or Firm* — Sheridan Ross PC

(57) ABSTRACT

Suspension device for a vehicle seat, comprising an upper suspension portion and a lower suspension portion, which are interconnected by a first swivel connector and a second swivel connector, wherein the suspension device comprises a first adjustable toothed wheel element arranged on the upper suspension portion, a second toothed wheel element connected to the first swivel connector for adjusting a position of a first spring unit, by means of which a spring force and a spring rate of the suspension device can be changed, and a third toothed wheel element which is at least operatively connected to the first and the second toothed wheel element and is connected to the first swivel connector.

11 Claims, 12 Drawing Sheets

(56) References Cited

U.S. PATENT DOCUMENTS

| | | | | |
|---|---|---|---|---|
| 5,150,870 A * | 9/1992 | Matsuura | B60N 2/1803 248/419 |
| 5,580,027 A * | 12/1996 | Brodersen | B60N 2/502 248/162.1 |
| 5,775,661 A * | 7/1998 | Matsumoto | B60N 2/1615 248/394 |
| 6,290,198 B1 * | 9/2001 | Kojima | B60N 2/1615 248/396 |
| 6,464,193 B1 * | 10/2002 | Nemoto | B60N 2/1615 248/396 |
| 6,484,995 B1 * | 11/2002 | Nemoto | B60N 2/1615 248/396 |
| 6,666,423 B1 * | 12/2003 | Nemoto | B60N 2/1615 248/396 |
| 6,732,842 B2 * | 5/2004 | Nemoto | B60N 2/224 192/43.1 |
| 6,749,169 B2 * | 6/2004 | Becker | B60N 2/1615 248/421 |
| 6,926,252 B2 * | 8/2005 | Hildebrandt | F02D 9/1065 123/396 |
| 7,517,020 B2 * | 4/2009 | Yokota | B60N 2/1615 248/421 |
| 8,800,947 B2 * | 8/2014 | Suzuki | B60N 2/161 248/421 |
| 8,807,507 B2 * | 8/2014 | Ito | B60N 2/1615 248/421 |
| 2005/0121585 A1 * | 6/2005 | Minai | B60N 2/1615 248/422 |
| 2009/0261224 A1 * | 10/2009 | Yamada | B60N 2/1615 248/421 |
| 2010/0001569 A1 * | 1/2010 | Shinozaki | B60N 2/1615 297/344.15 |

FOREIGN PATENT DOCUMENTS

| | | |
|---|---|---|
| DE | 35 34 344 A1 | 4/1986 |
| DE | 35 34 378 A1 | 5/1986 |
| DE | 35 00 506 A1 | 7/1986 |
| DE | 4403506 | 8/1995 |
| GB | 2166948 | 5/1986 |
| WO | WO 91/04881 | 4/1991 |

* cited by examiner

SUSPENSION DEVICE

CROSS-REFERENCE TO RELATED APPLICATIONS

This application claims the benefit of German Patent Application No. DE 10 2016 112 105.3 filed Jul. 1, 2016, the entire contents of which are incorporated herein by reference.

FIELD

The invention relates to a suspension device, in particular for a vehicle seat, comprising an upper suspension portion and a lower suspension portion, which can be interconnected by a first swivel connector and a second swivel connector.

BACKGROUND

Suspension devices of this type for vehicle seats are known from the prior art, wherein the upper suspension portion, the lower suspension portion, the first and the second swivel connector form a parallelogram, and therefore the upper suspension portion is in parallel with the lower suspension portion, even in the case of a spring movement. For the suspension of the vehicle seat, the suspension devices preferably comprise a spring, wherein the extension force of the suspension device can be adjusted by tensioning the spring.

However, when a relatively heavy driver sits down on the vehicle seat and wishes to adjust the extension force according to his weight, he must considerably increase the initial tension of the spring, which means a substantial exertion of force, and a rapid adjustment is also not provided thereby.

SUMMARY

It is accordingly an object of the present invention to provide a suspension device by means of which the extension force can be adjusted rapidly and with little exertion of force.

This object is achieved according to the features of claim 1. Advantageous embodiments of the invention can be found in the dependent claims.

The core concept of the invention is to provide a suspension device for a vehicle seat, comprising an upper suspension portion and a lower suspension portion, which are interconnected by a first swivel connector and a second swivel connector, wherein the suspension device comprises a first adjustable toothed wheel element arranged on the upper suspension portion, a second toothed wheel element connected to the first swivel connector for adjusting a position of a first spring unit, by means of which a spring force and a spring rate of the suspension device can be changed, and a third toothed wheel element which is at least operatively connected to the first and the second toothed wheel element and is connected to the first swivel connector.

Particularly advantageously, the second toothed wheel element is pivotally arranged relative to the first swivel connector.

Particularly advantageously, the upper suspension portion comprises a vehicle seat, in particular a vehicle seat having a seat portion and a backrest.

The term "spring unit" is understood to mean a unit which comprises at least one spring in the conventional sense. A spring unit or a spring can be designed to be mechanical, hydraulic or pneumatic. Advantageously, the spring can also be understood to be the spring unit itself. Said spring is preferably a tension spring, which can be designed in various ways. By means of a mechanical design, the weight of the suspension device can be further reduced, and a simpler construction can be provided.

The upper suspension portion, the lower suspension portion, and the first and second swivel connector preferably form a parallelogram. Advantageously, the first and second swivel connector are pivotally connected both to the lower suspension portion and to the upper suspension portion.

According to a preferred embodiment, the suspension device comprises more than one spring unit, that is to say in addition to the first spring unit, also a second, third, etc. spring unit, wherein each spring unit comprises at least one spring so that the construction height of the suspension device can be still further reduced thereby, since a force introduced onto the suspension device can be absorbed by two or more springs. As a result, the springs can thus have smaller dimensions. It is particularly advantageous to provide two springs for the suspension device. However, any desired number of springs, in particular two or more, can also be provided.

In this case, the first and the second end region of the spring unit are preferably the first and second end of the spring, wherein particularly preferably, the first and/or the second end of the spring comprise a eyelet so that the spring and/or the spring unit can easily be suspended or hung in openings or devices provided for this purpose.

According to the invention, the spring rate and the extension force of the suspension device according to claim 1 is changed by adjusting the position of the first spring unit and not by changing the spring tension of the spring unit, that is to say in particular of the spring.

In this case, changing the position is equivalent to changing the location of the spring unitspatial. By changing the position of the spring unit or of the spring of the spring unit, the length of a lever acting on the spring unit is changed.

According to a preferred embodiment, it is particularly advantageous for the first spring unit to be connected by a first end region by means of an adjustment device which can be operated by the second toothed wheel element to the first swivel connector, and by a second end region to the lower suspension portion. The position of the second end region of the first spring unit is substantially constant in this case. Advantageously, the adjustment device is rigidly connected to the second toothed wheel element so that during a rotation of the second toothed wheel element, the adjustment device is operated accordingly.

As a result, by means of the adjustment device, by operating the first toothed wheel element, in particular the position or location of the first end region of the first spring unit can be adjusted. In particular, as a result, the first end region is adjusted relative to the lower suspension portion, which preferably can be rigidly connected to a base, a chassis or the like. In this case, the lever acting on the first spring unit extends from a first swivel pin of the first swivel connector with the lower suspension portion as far as the first end region of the spring unit. By adjusting or displacing the first end region of the spring unit, the length of the lever can be changed so that the spring rate and the extension force of the suspension device can thereby be changed. The first end region thus accordingly comprises the force transmission point of the spring unit.

The extension force is changed on the basis of the following relationship. As is known, a torque is proportional to the length of a lever when the applied force is constant. By adjusting the position of the first end region, the length of the lever is changed. If a relatively heavy driver sits on the vehicle seat, which has the suspension device according to the invention, then the lever must accordingly be longer than in the case of a light driver.

As a result of the fact that, according to the invention, it is not the spring tension which is changed in order to change the extension force, but rather only the location of the spring unit, merely a small force is required from a user in order to change the extension force of the suspension device. As a result, it is also possible to change the extension force very rapidly.

According to a preferred embodiment, a lever element is provided, which is connected to the first toothed wheel element by means of a first axis of rotation, by means of which lever element the first toothed wheel element can be adjusted.

Alternatively, in this case, it is conceivable for an electric motor to be connected to the first toothed wheel element by means of the first axis of rotation, wherein by means of the motor, the first toothed wheel element can be adjusted, and according to the adjustment of the first toothed wheel element, the second toothed wheel element can be operated.

Preferably, the lever element is arranged on a first lateral face of the upper suspension portion, advantageously on a first lateral face of the seat portion so that the lever element is particularly simple to reach and to operate. Preferably, in a neutral position, the lever element points forwards in the longitudinal direction of the vehicle seat. In this case, the first axis of rotation is connected both to the lever element and also to the first toothed wheel element and extends substantially in a horizontal direction of the seat. By means of this arrangement, the lever element can also be well integrated into the cover of the upper suspension portion, by means of which an attractive appearance of the seat can be achieved. Furthermore, by arranging the lever element on the upper suspension portion, the lever element can always be easily reached, since it has a constant location in relation to the upper suspension portion.

According to another preferred embodiment, a transmission ratio of the first toothed wheel element and the second toothed wheel element is at least 2, more preferably at least 3, and particularly preferably at least 5.

A transmission ratio which is selected to be correspondingly large results in the following advantage. If the position of the first spring element has been adjusted according to a driver's wishes by adjusting the first toothed wheel element and correspondingly operating the second toothed wheel element and the adjustment device, then the driver wishes to maintain the respective position of the first spring element, which goes hand in hand with the desired spring rate.

Said spring rate should also be maintained during an oscillating process of the upper suspension portion relative to the lower suspension portion. By means of the relative movement of the upper suspension portion with respect to the lower suspension portion, the first toothed wheel element is correspondingly moved relative to the lower suspension portion.

According to the arrangement of the lower suspension portion, the upper suspension portion, the first and the second swivel connector as a parallelogram, the first toothed wheel element moves on a circular path in the case of a relative movement of the upper suspension portion with respect to the lower suspension portion. Likewise, the first swivel connector moves on a circular path together with the third toothed wheel element which is arranged thereon.

Since the second toothed wheel element is pivotally connected to the first swivel connector, the second toothed wheel element is unaffected by pivoting of the first swivel connector.

However, since the second toothed wheel element is operatively connected to the first toothed wheel element via the third toothed wheel element, and the first and the third toothed wheel element move on a circular path during a relative movement of the upper suspension portion with respect to the lower suspension portion, rolling movements of the toothed wheel elements are carried out and, by means of these rolling movements, a rotational movement of the second toothed wheel element is caused. In order to minimise this rotational movement, which means a further adjustment of the position of the first spring element, it is advantageous to select as large a transmission as possible so that by means of small rolling movements of the first and the third toothed wheel element, the effect of said wheel elements on the second toothed wheel element can be minimised.

Despite this minimisation, however, the second toothed wheel element is further rotated to a minor extent, wherein this rotation is of course dependent on the actual transmission ratio of the first toothed wheel element and the second toothed wheel element.

According to a particularly preferred embodiment, the second toothed wheel element is in the form of a sector of a circle. A centre angle or also central angle assigned to the circle sector in this case is at most 180°, more preferably at most 150° and particularly preferably at most 120°. As a result of the fact that the second toothed wheel element is in the form of a sector of a circle, less space is required by the second toothed wheel element in comparison with a full-sized toothed wheel element.

According to another preferred embodiment, the lever element is connected to the first axis of rotation and to the first toothed wheel element via a self-locking transmission in order to correspondingly restrict the movement of the second toothed wheel element in both directions of rotation by means of the operative connection of the first toothed wheel element to the second toothed wheel element. This embodiment is advantageous in particular when the second toothed wheel element is in the form of a sector of a circle and the operative contact with the first and the third toothed wheel element is interrupted by too great a rotation of the second toothed wheel element, and therefore no further rotation of the second toothed wheel element is possible.

According to another preferred embodiment, a fourth toothed wheel element is provided, which is connected to the first swivel connector and is in operative contact with the second and the third toothed wheel element or the first and the third toothed wheel element.

As a result, it is possible to change, and in particular to minimise the size of the toothed wheel elements, in particular the size of the third toothed wheel element, by means of which it is possible to arrange and configure the toothed wheel elements in a space-efficient manner. In particular, a third toothed wheel element which has a minimised diameter in this case has an advantageous effect on the kinematics of the seat as a whole.

According to an alternative embodiment, it is conceivable to provide a toothed belt element which is at least operatively connected to the second and the third toothed wheel element, the third toothed wheel element being in the form of a double toothed wheel element.

As a result, it is also possible in particular to minimise the size of the third toothed wheel element and accordingly reduce the space requirements of the toothed wheel elements. According to the alternative embodiment, it is necessary for the third toothed wheel element to be in the form of a double toothed wheel element in order to provide a toothed belt element. It is also conceivable for example to provide a roller chain or the like.

If, according to a preferred embodiment, four different toothed wheel elements are provided, in the case of a minor rotation of the second toothed wheel element, a corresponding rotation takes place as a result of an oscillating movement of the upper suspension portion with respect to the upper suspension portion. As a result of a compression movement, that is to say a downwards movement of the upper suspension portion, viewed in the vertical direction, then the first spring unit decompresses, whereas during the rebound, that is to say an upwards movement of the upper suspension portion, the first spring unit is more pretensioned. However, if only three different toothed wheel elements are provided, then the relationship is just the opposite, that is to say in the case of the compression movement, the spring unit is tensioned, and in the case of the rebound movement it is decompressed.

As a result, to a certain extent, it is possible to optimise and improve the vibration characteristics and the SEAT values on the basis of the excitation profile.

According to another embodiment, the adjustment device comprises a first suspending device, to which the first end region of the first spring unit can be connected, wherein the first suspending device is eccentrically arranged on the adjustment device.

When adjusting the position of the first spring unit, by means of the eccentric arrangement, preferably the first end region is rotated and thus the position of the first spring unit is changed.

According to another embodiment, the adjustment device comprises a second suspending device, to which a first end region of a vibration damper can be connected, the second suspending device being eccentrically connected to the adjustment device, and a second end region of the vibration damper being able to be connected to the lower suspension portion.

By such an arrangement of the vibration damper, it is therefore possible to adapt the damping performance of the vibration damper and thus the damping performance of the suspension when adjusting the extension force. If the lever is elongated, the lift of the vibration damper and the effective lever for a damping force introduction also increase correspondingly. Accordingly, when the lever is shortened, the lift of the vibration damper is reduced.

Further advantageous embodiments can be found in the dependent claims.

BRIEF DESCRIPTION OF THE DRAWINGS

Further aims, advantages and expedient uses of the present invention can be found below from the description in conjunction with the drawings, in which.

In the drawings, like components are each to be provided with corresponding reference numerals. For the sake of greater clarity, in some drawings components may not be provided with a reference numeral, but have been denoted at another point.

DETAILED DESCRIPTION

Figure 1:
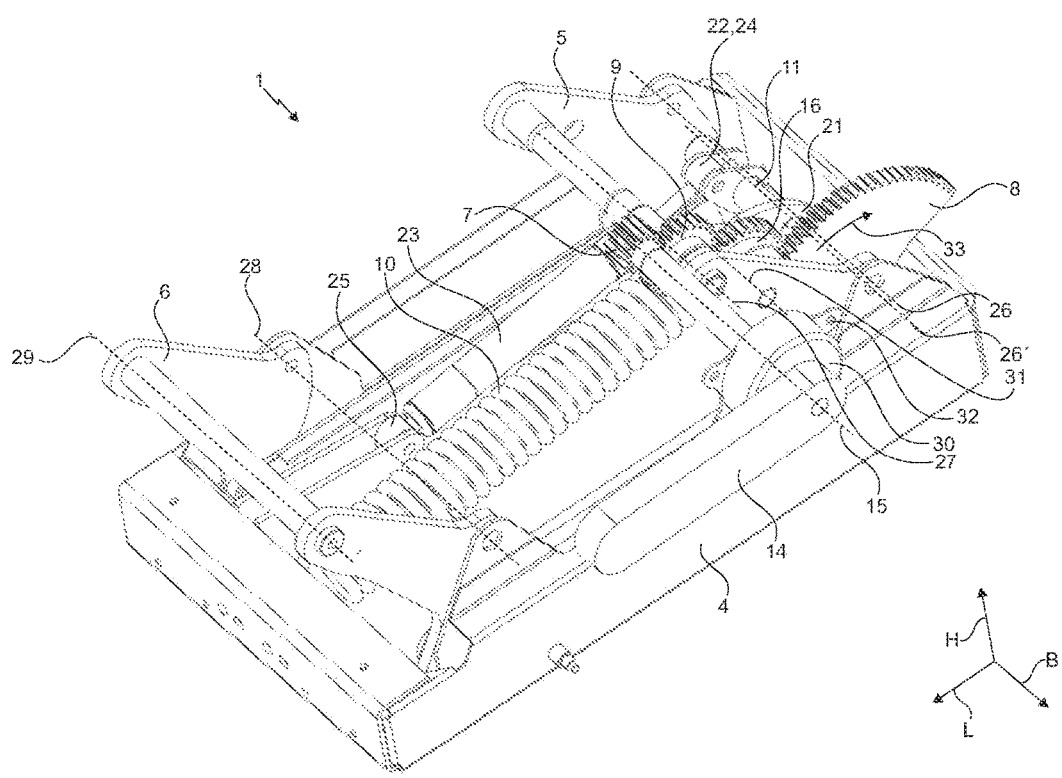
FIG. 1 is a perspective view of the suspension device according to a preferred embodiment.

FIG. 1 is a perspective view of a suspension device 1 according to a preferred embodiment. In this case, a lower seat structure can also be seen, comprising a lower suspension portion 4 which is rigidly connected for example to a chassis base (not shown here), a first swivel connector 5 which is pivotally connected to the lower suspension portion 4 by means of a first swivel pin 26 and to the upper suspension portion 3 (not shown here) by means of a second swivel pin 27, and a second swivel connector 6, which is pivotally connected to the lower suspension portion 4 by means of a third swivel pin 28 and to the upper suspension portion 3 by means of a second swivel pin 29.

According to the preferred embodiment of the suspension device 1, a first toothed wheel element 7, a second toothed wheel element 8, a third toothed wheel element 9 and a fourth toothed wheel element 16 can be seen, wherein by means of the fourth toothed wheel element 16, the second 8 and the third toothed wheel element 9 are in operative contact. Likewise, the first 7 toothed wheel element is in direct operative contact with the third toothed wheel element 9, so that after adjusting or operating the first toothed wheel element 7, firstly the third toothed wheel element 9 then the fourth toothed wheel element 16 and thus the second toothed wheel element 7 is operated.

In the present case, the first toothed wheel element 7 can be adjusted by means of a lever element 14 and a connecting rod 37, wherein the lever element 14 and accordingly the connecting rod 37 is mounted so as to be able to rotate about a first axis of rotation 15 and can be fixed to the upper suspension portion 3 by means of a fastener 30, which can comprise in particular a ball bearing or the like for easier rotation of the lever element. Particularly preferably, in this case the fastener 30 comprises a self-locking transmission (not shown here) which can be operated by the lever element 14, in particular by means of a ratcheting movement. If the self-locking transmission is not operated by the lever element 14, then the transmission and accordingly the first toothed wheel element 7 holds its position, by means of which in particular also the second toothed wheel element 8 maintains its position. For example, the fastener 30 can be connected to the upper suspension portion by means of screw connections, rivet connections or the like by means of fastening openings 32.

Furthermore, from FIG. 1 it can be seen that the second toothed wheel element 8 can be rotated about a second axis of rotation 26'. The third 9 and the fourth toothed wheel element 16 are likewise arranged on the first swivel connector 5, and the third toothed wheel element 9 is mounted so as to be able to rotate about the second swivel pin 27, and the fourth toothed wheel element 16 is mounted so as to be able to rotate about a fifth swivel pin 31.

Furthermore, the second toothed wheel element 8 is rigidly connected to an adjustment device 11 so that the adjustment device 11 is operated when the second toothed wheel element 8 is rotated about the second axis of rotation 26'. On the adjustment device 11, a first 21 and a second suspending device 22 are arranged in a rotationally fixed manner with respect to the adjustment device 11, said suspending devices being arranged in particular eccentrically with respect to the adjustment device 11. As a result, the position of a first spring unit 10 and in the present case also of a vibration damper 23 can be changed in that, in each case, the position of the first end region of the vibration damper 24 and of the first end region 12 of the first spring unit 10 can be changed by pivoting the adjustment device 11 and accordingly by pivoting the first end region 12 of the spring unit 10 and the first end region 24 of the vibration damper 23.

FIG. 1 shows a position of the suspension device 1 and in particular of the adjustment device 11 which corresponds to a light driver. In this case, the second toothed wheel element 8 has been pivoted according to a first direction of rotation 33 in such a way that the second toothed wheel element 8 is still in operative contact with the fourth toothed wheel element 16 by means of a first toothed wheel element region 35 of the second toothed wheel element 8, since the second toothed wheel element 8 is in the form of a sector of a circle in the present case. If the second toothed wheel element 8 is pivoted according to a second direction of rotation 35 in such a way that the second toothed wheel element 8, by means of a second toothed wheel element region 36, which differs from the first toothed wheel element region 35, then this position corresponds to a position for a heavy driver. Such a position for a heavy driver can be found in the following drawings.

In this case, the height of the vehicle seat 2 can be adjusted by means of a height adjustment device (not shown here).

Figure 2:
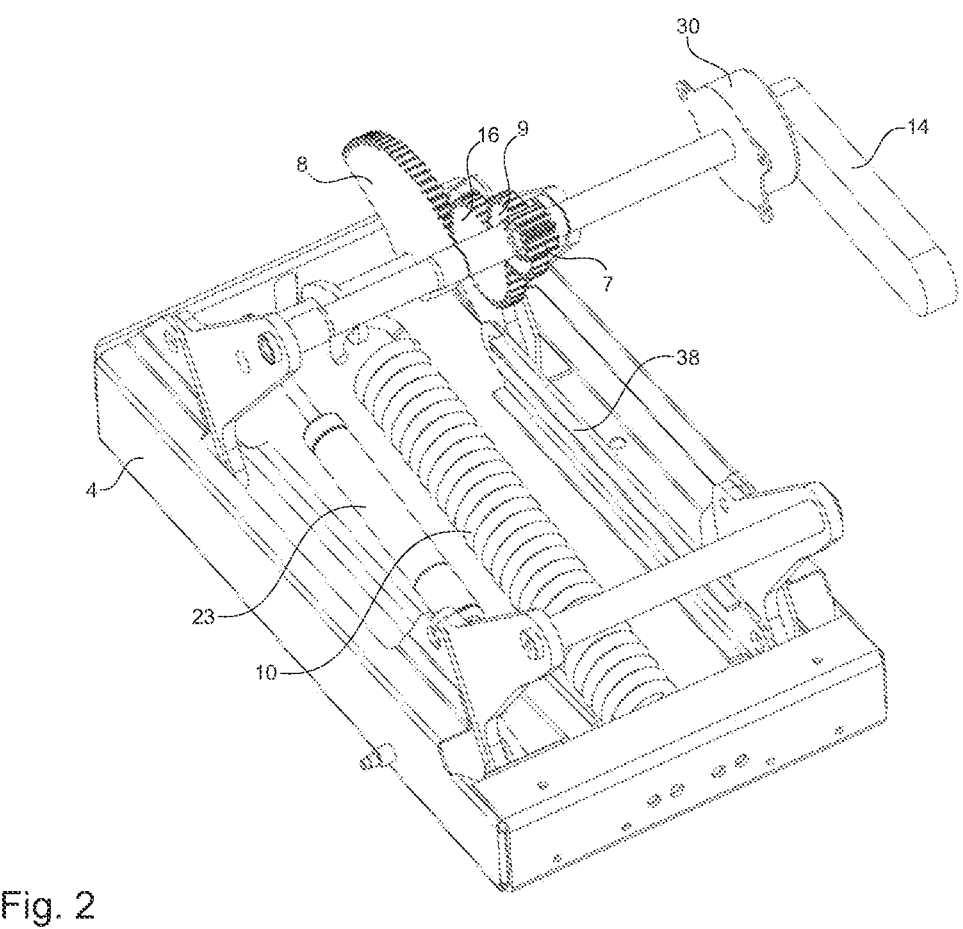
FIG. 2 is another perspective view of the suspension device according to FIG. 1.

In FIG. 2, the suspension device 1 of the vehicle seat 2 (not shown here) is shown in another perspective view. In this case, it can clearly be seen that between the first swivel connector 5 and the second swivel connector 6, a stabilising device 38 is arranged so as to be able to maintain the formed shape of the parallelogram as precisely as possible even in the case of an oscillating movement of the upper suspension portion 3 with respect to the lower suspension portion 4.

FIG. 2 also shows the suspension device 1 in a position for a light driver.

Figure 3A:
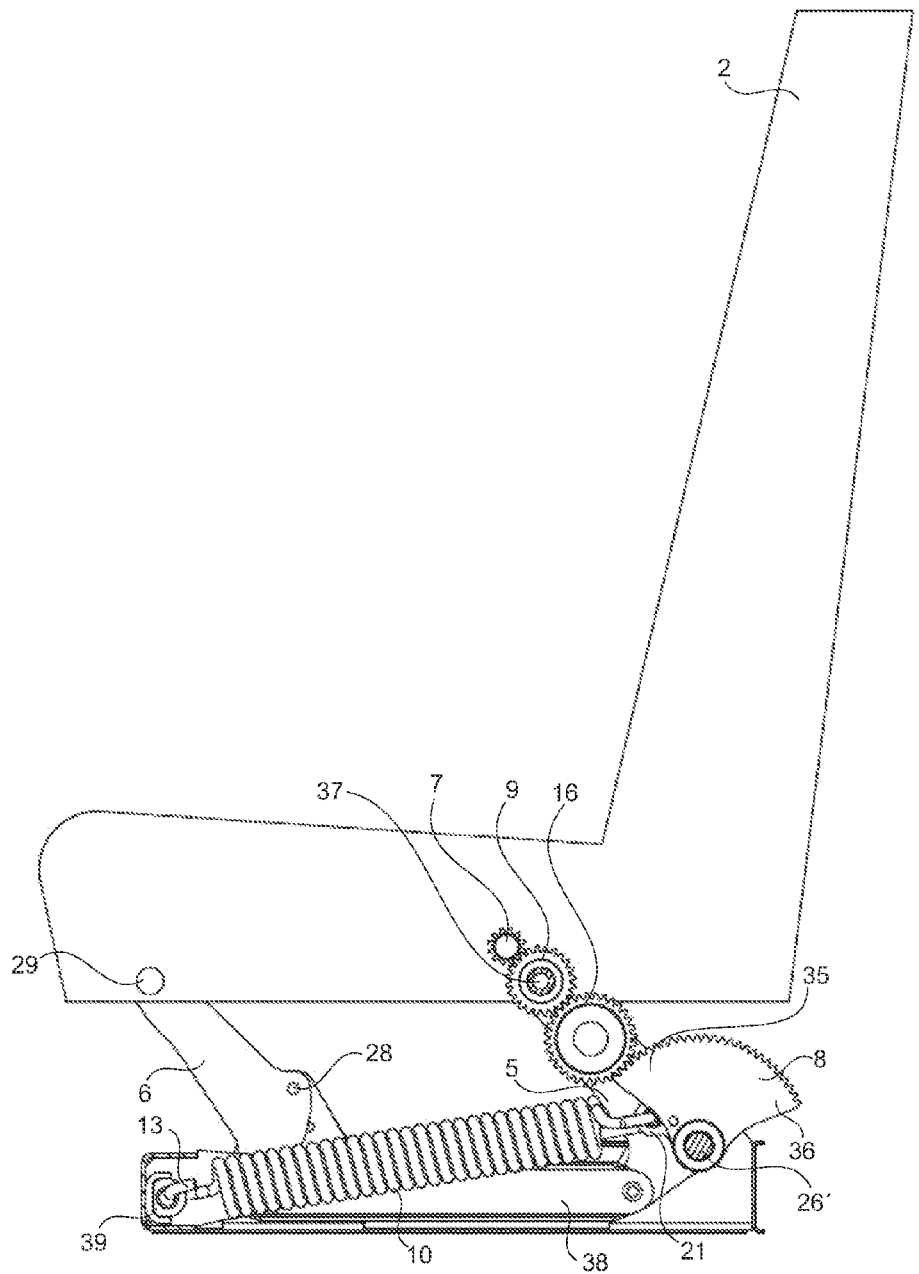
FIG. 3A is a side view of the suspension device for a light driver according to FIG. 1 and a vehicle seat having a first seat height.
Figure 3B:
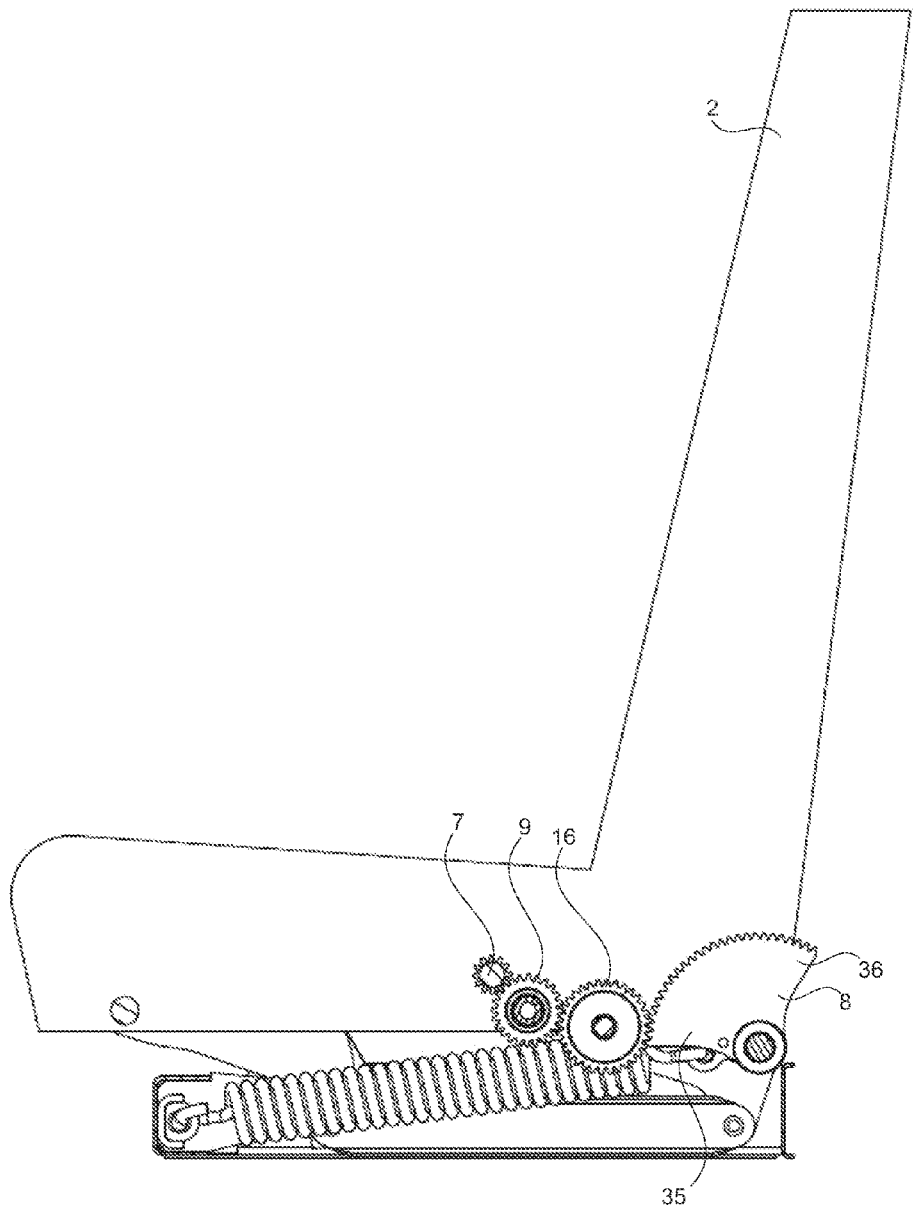
FIG. 3B is a side view of the suspension device for a light driver according to FIG. 1 and a vehicle seat having a second seat height.

FIGS. 3A and 3B show the suspension device 1 according to FIGS. 1 and 2 comprising a vehicle seat 2 in a side view, wherein the seat heights of the vehicle seat 2 differ from one another when FIGS. 3A and 3B are compared.

From a further comparison of FIGS. 3A and 3B, it can be seen that, when the first swivel connector 5 is pivoted, the axes of rotation or swivel pins 15, 26, 26', 27 of the toothed wheel elements 7, 8, 9, 16 are accordingly pivoted together. The position or location of the second toothed wheel element 8 with respect to the first swivel connector 5 is not impaired thereby, and therefore the second toothed wheel element 8 is still operatively connected to the other toothed wheel elements 7, 9, 16.

Figure 4A:
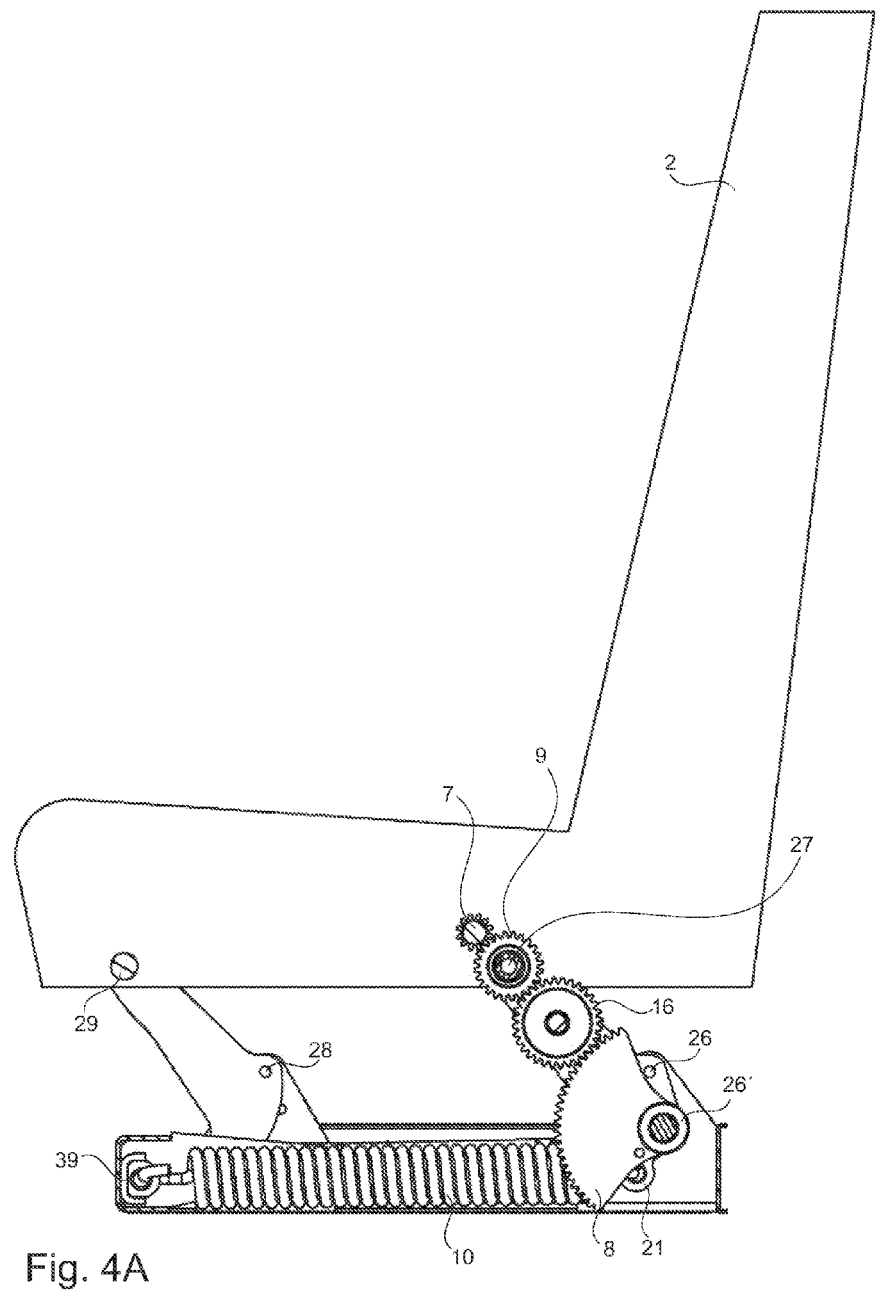
FIG. 4A is a side view of the suspension device for a heavy driver and a vehicle seat having a first seat height.
Figure 4B:
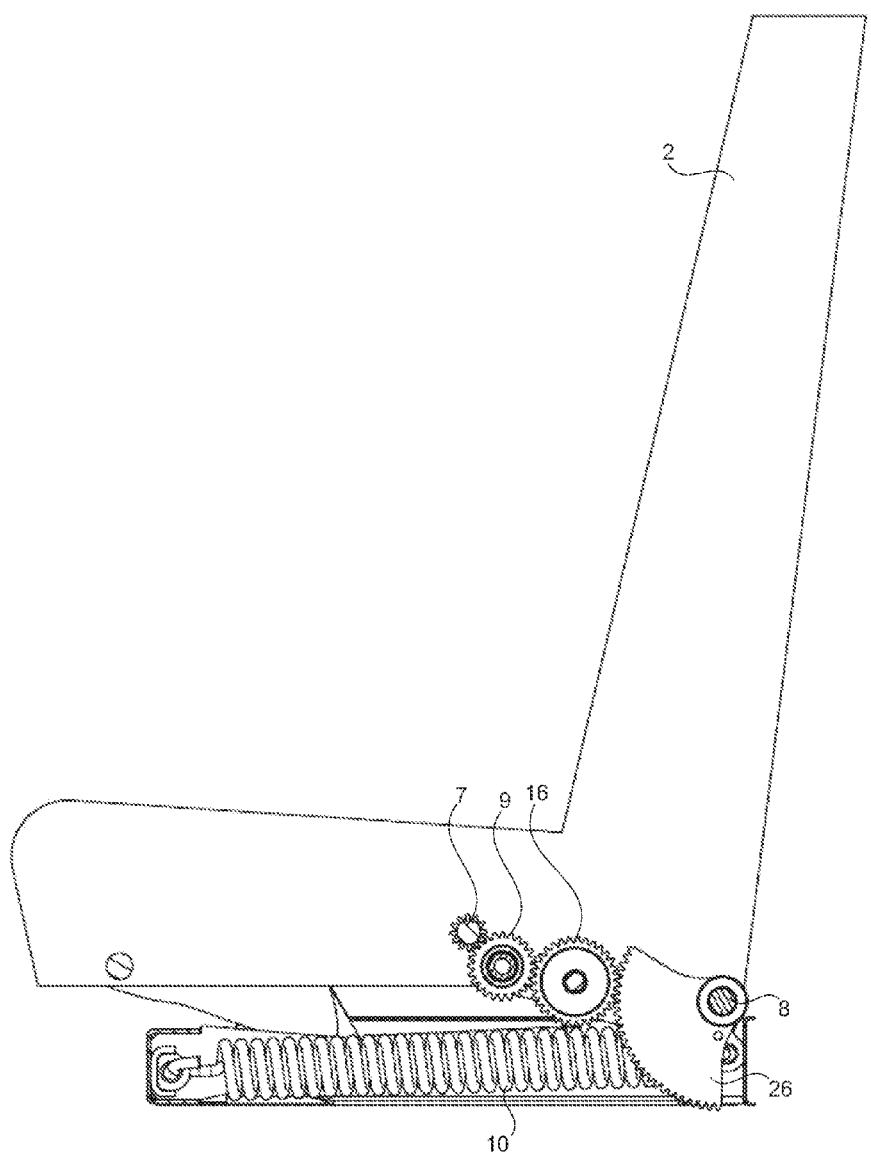
FIG. 4B is a side view of the suspension device for a heavy driver and a vehicle seat having a second seat height.

In a position of the second toothed wheel element 8 for a light driver, in the present case, the first toothed wheel element end region 35 is operatively connected to the fourth toothed wheel element 16, whereas in a position of the second toothed wheel element 8 for a heavy driver, such as in FIGS. 4A and 4B, the second toothed wheel element end region 36 is operatively connected to the fourth toothed wheel element 16.

FIG. 4A shows, in comparison with FIG. 4B, a vehicle seat which differs in terms of the seat height and in each case in a position for a heavy driver.

Figure 5A:
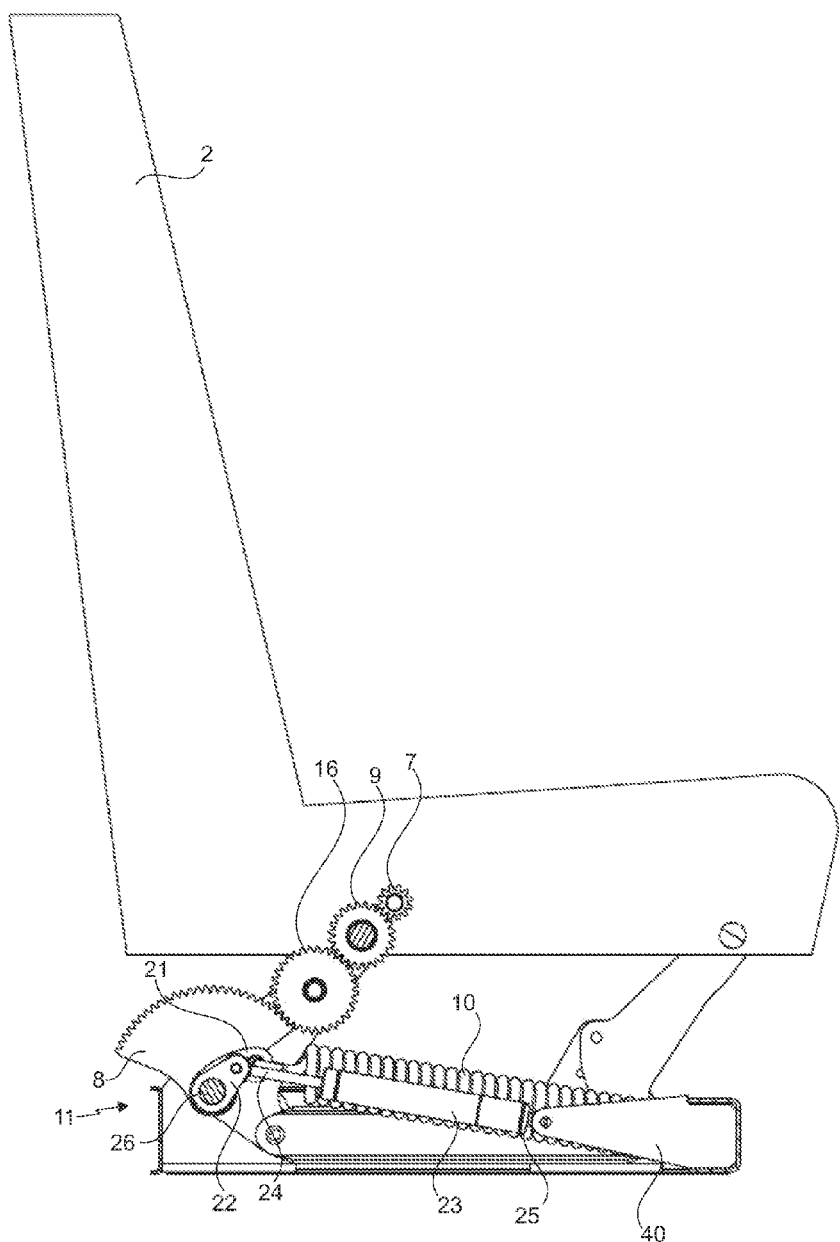
FIG. 5A is another side view of the suspension device according to FIG. 3A.
Figure 5B:
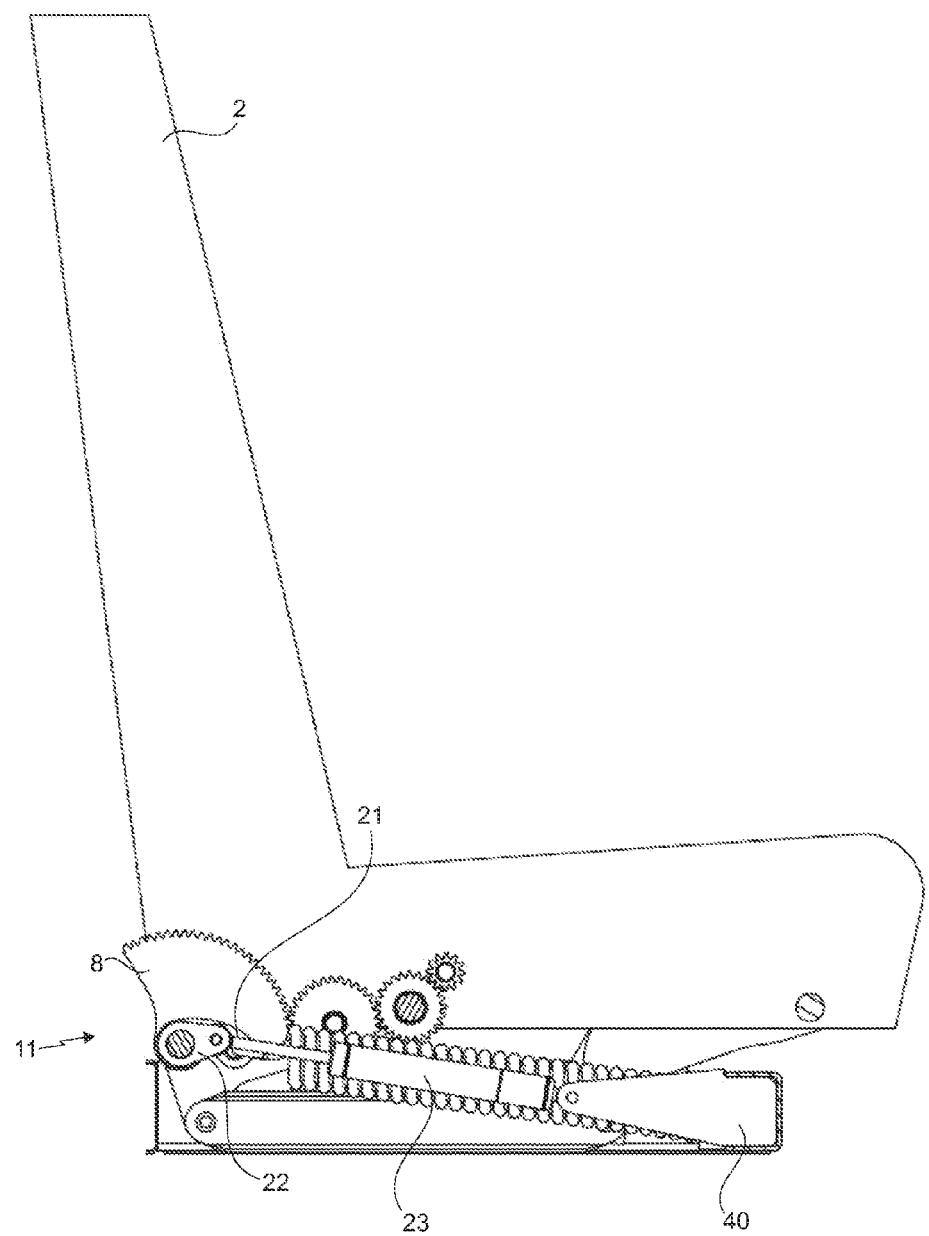
FIG. 5B is another side view of the suspension device according to FIG. 3B.

FIGS. 5A and 5B likewise show the position for a light driver according to another side view. As can be seen, a vibration damper 23 is additionally provided, which is connected by the first end region 24 thereof, by means of a second suspending device 22, to the adjustment device 11, and is connected by the second end region 25 thereof, by means of a fourth suspending device 40, to the lower suspension portion 4.

Figure 6A:
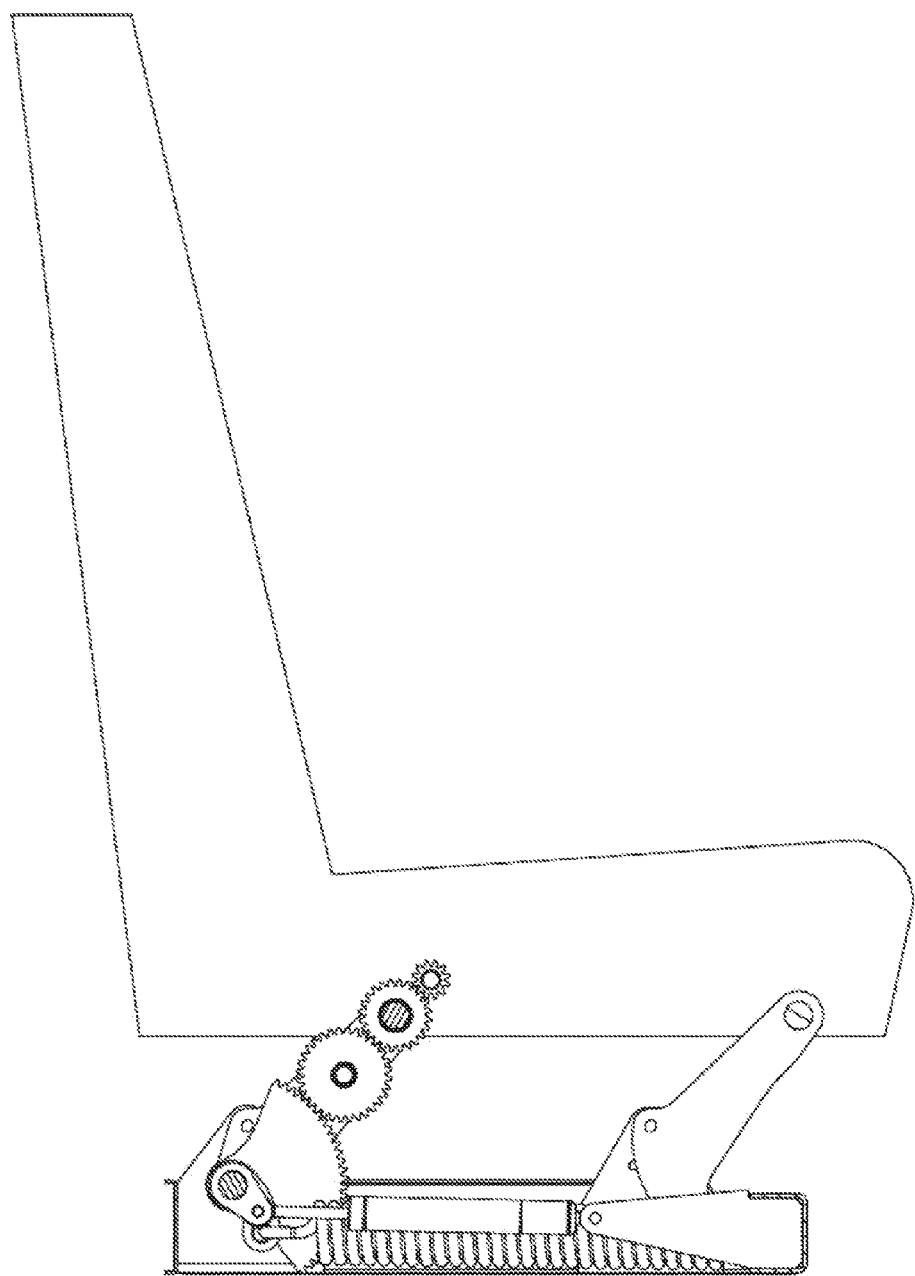
FIG. 6A is another side view of the suspension device according to FIG. 4A.
Figure 6B:
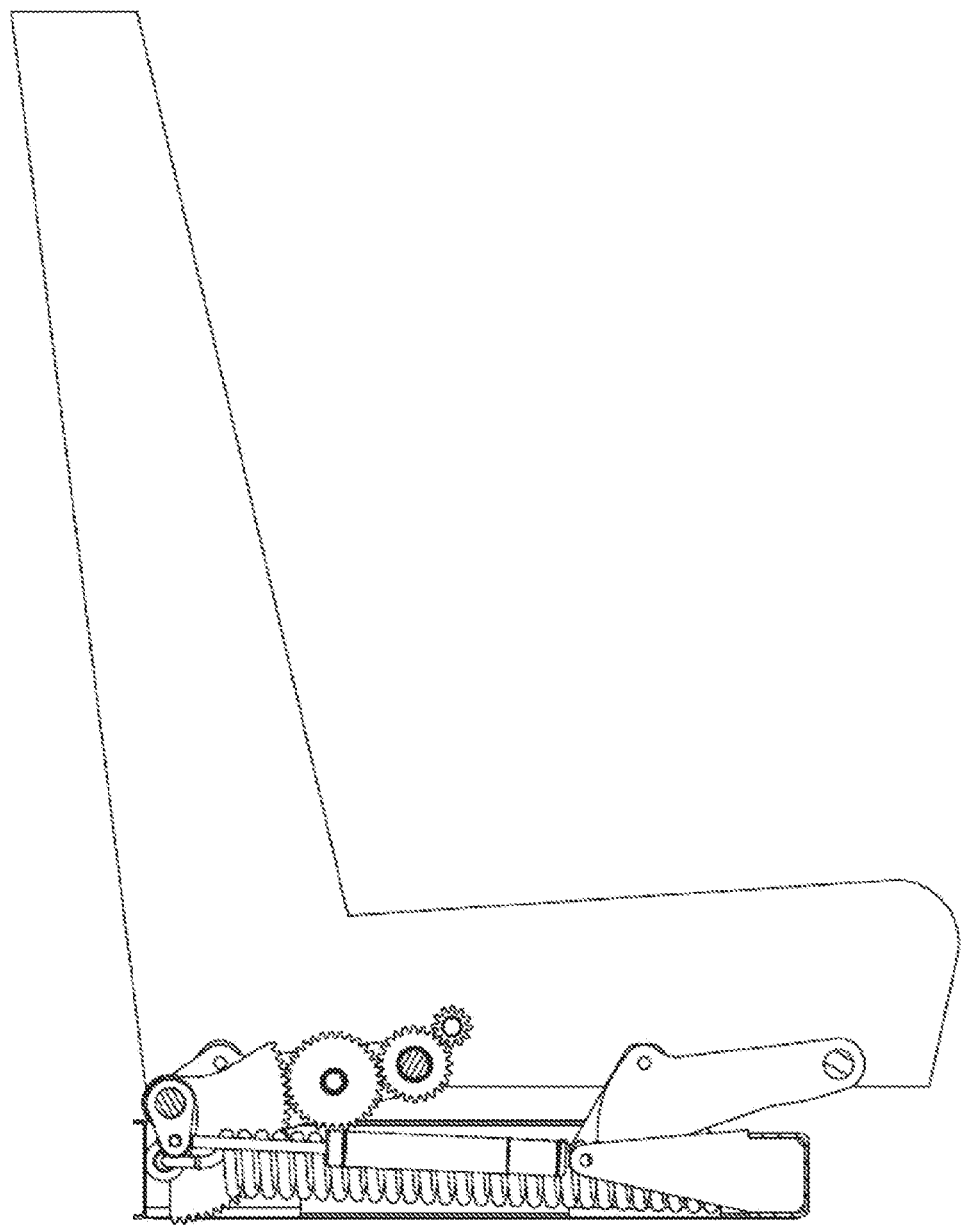
FIG. 6B is another side view of the suspension device according to FIG. 4B.

A corresponding view of the suspension device 1 comprising a vibration damper 23 for a position for a heavy driver is shown according to FIGS. 6A and 6B.

Overall, according to the seat height, which accordingly corresponds to a deflection of the upper suspension portion 3 with respect to the lower suspension portion 4, the spring rate or the spring force or the extension force is automatically adapted by means of the adjustment device 11.

However, it is also possible, in the case of a predetermined seat height, to further adjust the suspension device, either from the position of the light driver to the position of the heavy driver or vice versa.

Figure 7A:
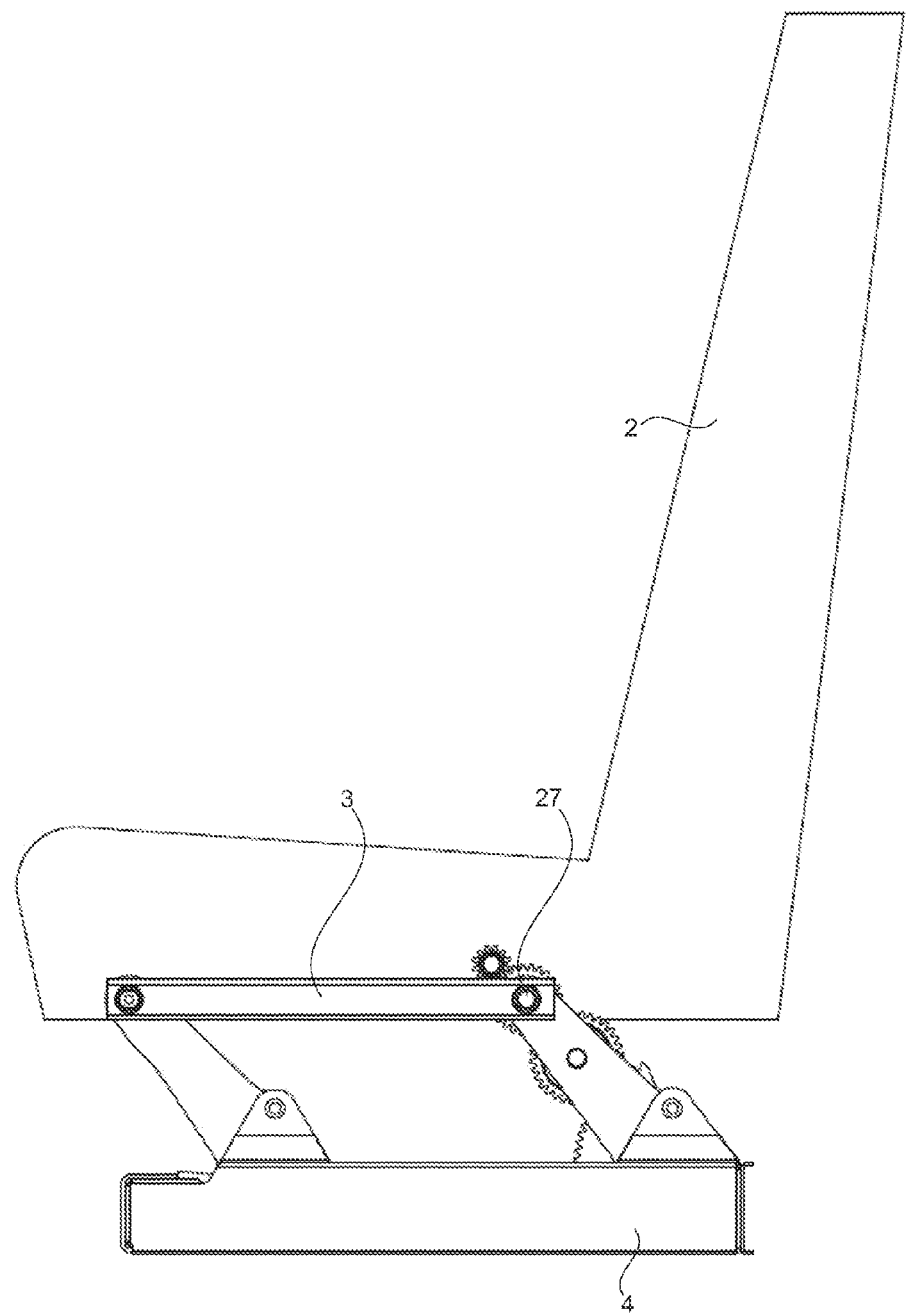
FIG. 7A shows the vehicle seat in a first seat inclination position.
Figure 7B:
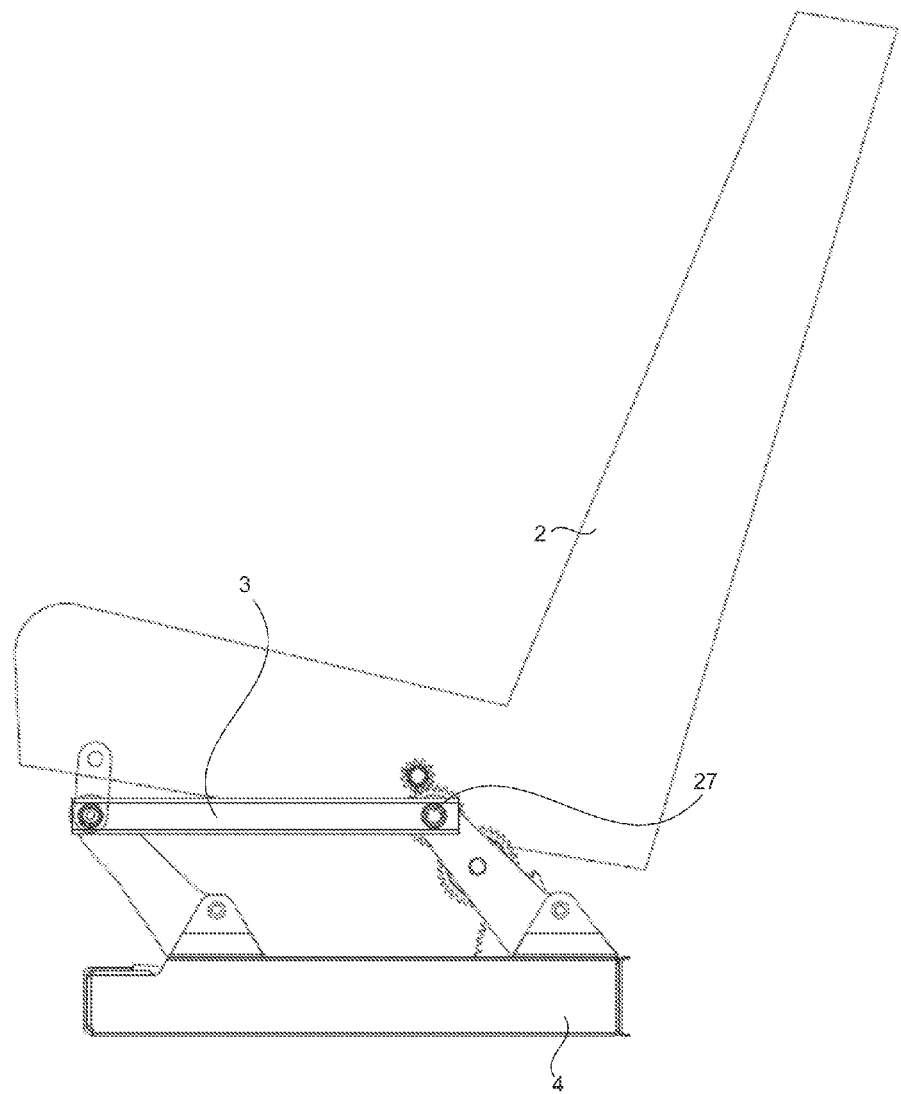
FIG. 7B shows the vehicle seat in a second seat inclination position.

FIGS. 7A and 7B show, in particular in comparison with one another, a possible embodiment of a seat inclination adjustment.

According to FIG. 7A, the seat inclination angle is 0°, i.e. in this case, the upper suspension portion 3 is substantially in parallel with the lower suspension portion 4.

In this case, a seat inclination can be achieved as shown in FIG. 7B, in that the seat 2 is pivoted about the second swivel pin 27. A corresponding rotation of the vehicle seat with respect to the upper suspension portion 3 results in this case in a rotation of the first toothed wheel element 7 about the pin 27 and accordingly a rolling movement of the first toothed wheel element 7 on the third toothed wheel element 9. In order to obtain a secure driving position of the vehicle seat 2, according to the pivoting of the seat 2 about the pin 27, a spacer 41 is introduced between the fourth swivel pin and the vehicle seat 2, said spacer being preferably designed such that it can have a variable length.

All of the features disclosed in the application documents are claimed as essential to the invention, whether they are novel individually or in combination over the prior art.

| List of reference numerals | |
|---|---|
| 1 | suspension device |
| 2 | vehicle seat |
| 3 | upper suspension portion |
| 4 | lower suspension portion |
| 5 | first swivel connector |
| 6 | second swivel connector |
| 7 | first toothed wheel element |
| 8 | second toothed wheel element |
| 9 | third toothed wheel element |

-continued

| List of reference numerals | |
|---|---|
| 10 | first spring unit |
| 11 | adjustment device |
| 12 | first end region of the spring unit |
| 13 | second end region of the spring unit |
| 14 | lever element |
| 15 | first axis of rotation |
| 16 | fourth toothed wheel element |
| 17 | first end stop |
| 18 | second end stop |
| 19 | first direction of rotation |
| 20 | second direction of rotation |
| 21 | first suspending device |
| 22 | second suspending device |
| 23 | vibration damper |
| 24 | first end region of the vibration damper |
| 25 | second end region of the vibration damper |
| 26 | first swivel pin |
| 27 | second swivel pin |
| 28 | third swivel pin |
| 29 | fourth swivel pin |
| 30 | fastener |
| 31 | fifth swivel pin |
| 32 | fastening opening |
| 33 | first direction of rotation |
| 34 | second direction of rotation |
| 35 | first toothed wheel element end region |
| 36 | second toothed wheel element end region |
| 37 | connecting rod |
| 38 | stabilising connection |
| 39 | third suspending device |
| 40 | fourth suspending device |
| 41 | spacer |
| B | horizontal direction |
| L | longitudinal direction |
| H | vertical direction |

The invention claimed is:

1. A suspension device for a vehicle seat, comprising:
an upper suspension portion and a lower suspension portion, which are interconnected by a first swivel connector and a second swivel connector,
a first adjustable toothed wheel element arranged on the upper suspension portion,
a second toothed wheel element connected to the first swivel connector for adjusting a position of a first spring unit, by means of which a spring force and a spring rate of the suspension device can be changed,
a third toothed wheel element which is at least operatively connected to the first and the second toothed wheel element and is connected to the first swivel connector, and
a fourth toothed wheel element which is in operative contact with the second and the third toothed wheel element and is connected to the first swivel connector.

2. The suspension device according to claim 1, wherein the first spring unit is connected by a first end region by means of an adjustment device which can be operated by the second toothed wheel element to the first swivel connector, and by a second end region to the lower suspension portion.

3. The suspension device according to claim 1, wherein a lever element is connected to the first toothed wheel element by means of a first axis of rotation, by means of which lever element the first toothed wheel element can be adjusted.

4. The suspension device according to claim 1, wherein the second toothed wheel element is in the form of a sector of a circle.

5. The suspension device according to claim 1, wherein a transmission ratio of the first toothed wheel element and the second toothed wheel element is at least 2.

6. The suspension device according to claim 3, wherein the lever element is connected to the first axis of rotation and to the first toothed wheel element via a self-locking transmission.

7. The suspension device according to claim 2, wherein the adjustment device comprises a first suspending device, to which the first spring unit can be connected, the first suspending device being eccentrically connected to the adjustment device.

8. The suspension device according to claim 2, wherein the adjustment device comprises a second suspending device, to which a first end region of a vibration damper can be connected, the second suspending device being eccentrically connected to the adjustment device, and a second end region of the vibration damper being able to be connected to the lower suspension portion.

9. The suspension device according to claim 5, wherein a transmission ratio of the first toothed wheel element and the second toothed wheel element is at least 3.

10. The suspension device according to claim 9, wherein a transmission ratio of the first toothed wheel element and the second toothed wheel element is at least 5.

11. A suspension device fora vehicle seat, comprising:
an upper suspension portion and a lower suspension portion, which are interconnected by a first swivel connector and a second swivel connector,
a first adjustable toothed wheel element arranged on the upper suspension portion,
a second toothed wheel element connected to the first swivel connector for adjusting a position of a first spring unit, by means of which a spring force and a spring rate of the suspension device can be changed,
a third toothed wheel element which is at least operatively connected to the first and the second toothed wheel element and is connected to the first swivel connector, and
a fourth toothed wheel element which is in operative contact with the first and the third toothed wheel element and is connected to the first swivel connector.

* * * * *